(12) United States Patent
Lee et al.

(10) Patent No.: US 12,725,209 B1
(45) **Date of Patent: *Sep. 1, 2026**

(54) METHODS AND APPARATUS FOR CONSTRUCTING MACHINE LEARNING MODELS TO PROCESS USER DATA AND PROVIDE ADVANCE ACCESS TO PAYMENTS

(71) Applicant: DailyPay, LLC, New York, NY (US)

(72) Inventors: Jason Lee, New York, NY (US); Robert Louis Law, II, New York, NY (US); Konstantin Getmanchuk, Brooklyn, NY (US)

(73) Assignee: DailyPay, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,239

(22) Filed: Jan. 9, 2024

Related U.S. Application Data

(63) Continuation of application No. 17/823,084, filed on Aug. 30, 2022, now Pat. No. 11,908,022, which is a (Continued)

(51) Int. Cl.
*G06Q 40/00* (2023.01)
*G06F 16/215* (2019.01)

(Continued)

(52) U.S. Cl.
CPC ......... *G06Q 40/125* (2013.12); *G06F 16/215* (2019.01)

(58) Field of Classification Search
CPC ............................ G06Q 40/125; G06F 16/215
See application file for complete search history.

(56) References Cited

U.S. PATENT DOCUMENTS 4,466,078 A * 8/1984 Treiman ................... G07C 1/14 235/377
5,842,182 A * 11/1998 Bonner ................ G06Q 10/109 235/377

(Continued)

OTHER PUBLICATIONS

Final Office Action mailed Nov. 25, 2020 for U.S. Appl. No. 16/265,697, 12 pages.

(Continued)

*Primary Examiner* — Talia F Crawley
(74) *Attorney, Agent, or Firm* — COOLEY LLP

(57) ABSTRACT

Devices, systems, and methods herein relate to generating a machine learning model for providing access to earned income. In some embodiments, an apparatus includes a memory and a processor. The processor may be configured to receive calibration datasets including (1) historical time data indicating time worked by a set of users and (2) historical earnings data indicating earnings made by the set of users. The processor may be configured to construct, based on the calibration datasets, a model for identifying anomalous data. The processor may be configured to receive, from a compute device associated with an entity, raw data for a current time period. The processor may be configured to process the raw data by removing anomalous data to produce processed data. The processor may be configured to determine an available balance for each user from the set of users based on the processed data.

20 Claims, 8 Drawing Sheets

Related U.S. Application Data continuation of application No. 17/402,062, filed on Aug. 13, 2021, now Pat. No. 11,443,392, which is a continuation of application No. 16/265,697, filed on Feb. 1, 2019, now Pat. No. 11,094,020.

(60) Provisional application No. 62/625,118, filed on Feb. 1, 2018.

(51) Int. Cl.

| | |
|---|---|
| ***G06K 7/10*** | (2006.01) |
| ***G06Q 10/06*** | (2023.01) |
| ***G06Q 20/10*** | (2012.01) |
| ***G06Q 40/12*** | (2023.01) |
| ***H04L 9/00*** | (2022.01) |

(56) References Cited

U.S. PATENT DOCUMENTS

| | | | | |
|---|---|---|---|---|
| 6,401,079 | B1 * | 6/2002 | Kahn | G06Q 20/102 705/30 |
| 6,764,013 | B2 | 7/2004 | Ben-Aissa | |
| 6,802,005 | B1 | 10/2004 | Berson | |
| 8,346,586 | B1 * | 1/2013 | Prakken | G06Q 10/105 705/7.11 |
| 8,751,338 | B2 | 6/2014 | Dombroski et al. | |
| 10,339,608 | B1 | 7/2019 | Haitz et al. | |
| 11,094,020 | B1 * | 8/2021 | Lee | G06F 16/215 |
| 11,176,109 | B2 * | 11/2021 | Kholodkov | G06F 16/215 |
| 11,443,392 | B1 | 9/2022 | Lee et al. | |
| 11,908,022 | B1 | 2/2024 | Lee et al. | |
| 2005/0075969 | A1 | 4/2005 | Nielson et al. | |
| 2006/0059063 | A1 * | 3/2006 | LaComb | G06Q 30/02 705/35 |
| 2011/0063469 | A1 * | 3/2011 | Omi | H04N 5/32 348/222.1 |
| 2012/0102002 | A1 * | 4/2012 | Sathyanarayana | G06F 16/215 707/687 |
| 2014/0032506 | A1 * | 1/2014 | Hoey | G06F 16/215 707/691 |
| 2016/0086261 | A1 | 3/2016 | Shah et al. | |
| 2016/0371661 | A1 | 12/2016 | Shah et al. | |
| 2017/0243223 | A1 * | 8/2017 | Kolotinsky | G06Q 20/4016 |
| 2018/0225320 | A1 | 8/2018 | Saini et al. | |
| 2021/0342347 | A1 * | 11/2021 | de Abreu Pinho | G06F 16/25 |

OTHER PUBLICATIONS

Non-Final Office Action for U.S. Appl. No. 17/823,084 dated Mar. 30, 2023, 10 pages.

Non-Final Office Action mailed Jul. 24, 2020 for U.S. Appl. No. 16/265,697, 10 pages.

Non-Final Office Action mailed Nov. 26, 2021 for U.S. Appl. No. 17/402,062, 9 pages.

* cited by examiner

Figures 3C, 3D, 3E:
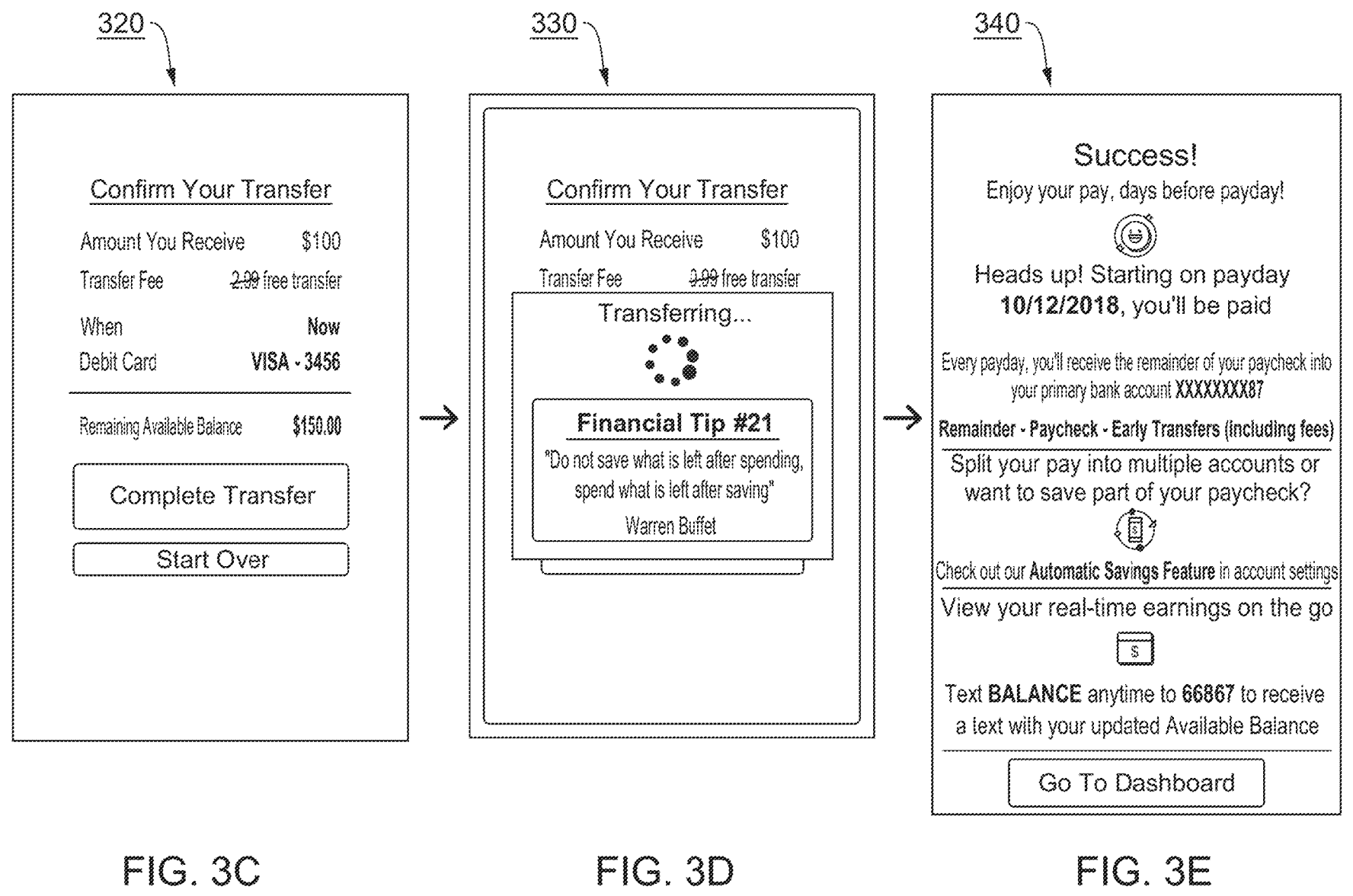

320

Confirm Your Transfer

Amount You Receive $100

Transfer Fee ~~2.99~~ free transfer

When Now

Debit Card VISA - 3456

Remaining Available Balance $150.00

Complete Transfer

Start Over

Confirm Your Transfer

Amount You Receive $100

Transfer Fee ~~2.99~~ free transfer

Transferring...

Financial Tip #21

"Do not save what is left after spending, spend what is left after saving"

Warren Buffet

Success!

Enjoy your pay, days before payday!

Heads up! Starting on payday 10/12/2018, you'll be paid

Every payday, you'll receive the remainder of your paycheck into your primary bank account XXXXXXX87

Remainder - Paycheck - Early Transfers (including fees)

Split your pay into multiple accounts or want to save part of your paycheck?

Check out our Automatic Savings Feature in account settings

View your real-time earnings on the go

Text BALANCE anytime to 66867 to receive a text with your updated Available Balance Go To Dashboard

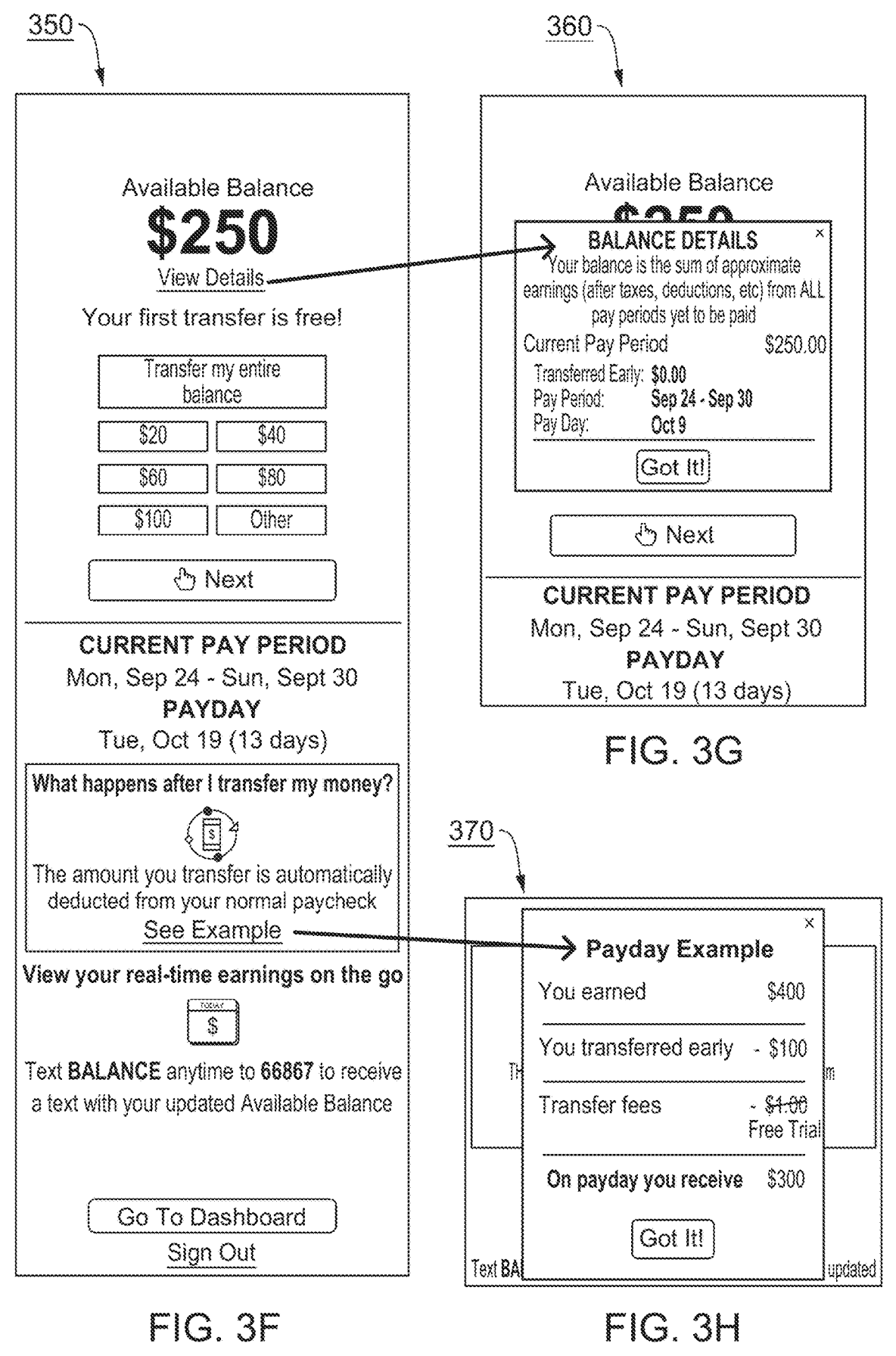

Available Balance
$250
View Details
Your first transfer is free!
Transfer my entire balance
$20 $40
$60 $80
$100 Other
Next
CURRENT PAY PERIOD
Mon, Sep 24 - Sun, Sept 30
PAYDAY
Tue, Oct 19 (13 days)
What happens after I transfer my money?
The amount you transfer is automatically deducted from your normal paycheck
See Example
View your real-time earnings on the go
TODAY
$
Text BALANCE anytime to 66867 to receive a text with your updated Available Balance
Go To Dashboard
Sign Out

Available Balance
BALANCE DETAILS
Your balance is the sum of approximate earnings (after taxes, deductions, etc) from ALL pay periods yet to be paid
Current Pay Period $250.00
Transferred Early: $0.00
Pay Period: Sep 24 - Sep 30
Pay Day: Oct 9
Got It!
Next
CURRENT PAY PERIOD
Mon, Sep 24 - Sun, Sept 30
PAYDAY
Tue, Oct 19 (13 days)

Payday Example
You earned $400
You transferred early - $100
Transfer fees - ~~$1.00~~ Free Trial
On payday you receive $300
Got It!
Text BA updated

FIG. 3H

METHODS AND APPARATUS FOR CONSTRUCTING MACHINE LEARNING MODELS TO PROCESS USER DATA AND PROVIDE ADVANCE ACCESS TO PAYMENTS

CROSS-REFERENCE TO RELATED APPLICATIONS

This application is a continuation of U.S. application Ser. No. 17/823,084, filed Aug. 30, 2022, entitled "Methods and Apparatus for Constructing Machine Learning Models to Process User Data and Provide Advance Access to Payments," now U.S. Pat. No. 11,908,022, which is a continuation of U.S. application Ser. No. 17/402,062, filed Aug. 13, 2021, entitled "Methods and Apparatus for Constructing Machine Learning Models to Process User Data and Provide Advance Access to Payments," now U.S. Pat. No. 11,443,392, which is a continuation of U.S. application Ser. No. 16/265,697, filed Feb. 1, 2019, titled "Methods and Apparatus for Constructing Machine Learning Models to Process User Data and Provide Advance Access to Payments," now U.S. Pat. No. 11,094,020, which claims benefit of U.S. Provisional Application No. 62/625,118, filed Feb. 1, 2018, entitled "Methods and Apparatus for Processing and Providing Access to Payments," the contents of each of which is hereby incorporated by reference in its entirety.

BACKGROUND

Computing systems for time and/or payroll management can track time worked, earnings data, and/or other data for an organization. These systems, however, are typically limited in their functionality. For example, these systems may receive time data and/or earnings data from an organization, which can include erroneous data, e.g., due to time entry errors, earning miscalculations, etc., and not have efficient or robust means to identify this erroneous data. These systems typically also work based on set pay periods (e.g., a bi-weekly pay period), and may lack the capability to analyze time data as it comes in during a pay period to determine whether a balance may be available to a user (e.g., an employee) in advance of the end of the pay period. Therefore, employees generally have limited options to receive income before payday. It may be desirable to provide improved systems, devices, and methods of processing and analyzing user data (e.g., time and earnings data) to provide users with advance access to payments.

SUMMARY

Described herein are systems, devices, and methods for constructing machine learning models for processing and analyzing user data to provide access to earned income. In some embodiments, an apparatus is provided, comprising a memory and a processor operatively coupled to the memory. The processor may be configured to receive calibration datasets including (1) historical time data indicating time worked by a set of users and (2) historical earnings data indicating earnings made by the set of users. The processor may be configured to construct, based on the historical time data and the calibration datasets, a first model for identifying anomalous time data. The processor may be configured to construct, based on the historical earnings data and the calibration datasets, a second model for identifying anomalous earnings data. The processor may be configured to receive, from a compute device associated with an entity, raw data for a current time period that includes (1) time data indicating time worked by the set of users affiliated with the entity and (2) earnings data indicating earnings made by the set of users. The processor may be configured to identify, using the first model and the second model, anomalous time data and anomalous earnings data in the raw data. The processor may be configured to process the raw data by removing the anomalous time data and the anomalous earnings data, to produce processed data. The processor may be configured to determine an available balance for each user from the set of users based on the processed data.

In some embodiments, the processor is configured to construct the first model by mapping the historical time data to a feature space based on information associated with the set of users and the entity. The historical time data is represented as a first set of data points in the feature space. The processor is configured to define a function that represents a boundary in the feature space between (1) a first subset of the first set of data points representing historical time data associated with normal data and (2) a second subset of the first set of data points representing historical time data associated with anomalous data. The processor may be configured to identify, using the first model, the anomalous time data in the raw data by mapping the time data to the feature space based on the information associated with the set of users and the entity. The time data is represented as a second set of data points in the feature space. The process is configured to identify, using the function, a subset of the second set of data points that is in a region of the feature space that includes the second subset of the first set of data points.

In some embodiments, the first model is an ensemble model that combines (1) a first output from a support vector machine learning model and (2) a second output from a local outlier factor calculation, to produce a combined output for identifying anomalous time data.

In some embodiments, the processor is further configured to calculate aggregated time data by aggregating, for each user from a group of subsets of users from the set of users, time data of that user, aggregating, for each subset of users from the set of users sharing one or more characteristics, time data of one or more users within that subset, and aggregating the time data across the set of users. The processor may be configured to identify, using the first model, the anomalous time data based on the aggregated time data.

In some embodiments, the calibration datasets further include historical net-to-gross ratio data indicating ratios of net pay to gross pay for the set of users. The processor may be further configured to construct, based on the historical net-to-gross ratio data and the calibration datasets, a third model for determining a net-to-gross ratio, and determine, using the third model and using the raw data, a net-to-gross ratio for each user from the set of users. The processor may be configured to determine the available balance for each user from the set of users based on the processed data and the net-to-gross ratio for that user.

In some embodiments, the processor is configured to determine the available balance for each user from the set of users by determining gross earnings for that user for the current time period, determining a level of risk associated with that user based on information associated with that user, and adjusting the gross earnings based on a net-to-gross ratio for that user and the level of risk associated with that user.

In some embodiments, the compute device is a first compute device, and the processor is further configured to receive, from the first compute device, user roster data including information identifying the set of users and direct deposit data associated with the set of users, receive a request for advance payment from a user, determine, in response to receiving the request, that the user belongs to the set of users based on the user roster data and the direct deposit data, and send, after determining that the user belongs to the set of users, an instruction to a second compute device to transfer at least a portion of the available balance determined for the user to an account accessible by the user. The second compute device is independent of the first compute device.

In some embodiments, the earnings data includes gross earnings data and net earnings data. The processor may be further configured to determine a net-to-gross ratio for each user from the set of users based on the gross earnings data and the net earnings data. The processor may be configured to determine the available balance for each user from the set of users based on the processed data and the net-to-gross ratio for that user.

Also described herein are methods of determining an available balance such as for accessing earned income. In general, these methods include the steps of receiving, at a first compute device, calibration datasets including (1) historical time data indicating time worked by a set of users and (2) historical earnings data indicating earnings made by the set of users. Based on the calibration datasets, a model may be constructed that defines a separation between normal data and anomalous data. From a second compute device associated with an entity, raw data may be received for a current time period that includes (1) time data indicating time worked by the set of users affiliated with the entity and (2) earnings data indicating earnings made by the set of users. Based on the raw data, a first set of outputs may be generated using the model. Based on the raw data, a second set of outputs may be generated using a local outlier factor algorithm. Based on the first set of outputs and the second set of outputs, anomalous time data and anomalous earnings data may be identified in the raw data. The raw data may be processed by removing the anomalous time data and the anomalous earnings data, to produce processed data. An available balance may be determined for each user from the set of users based on the processed data.

In some embodiments, constructing the model includes mapping the calibration datasets to a feature space based on information associated with the set of users and the entity. The calibration datasets are represented as a first set of data points in the feature space. Constructing the model further includes defining a function that represents a boundary in the feature space between (1) a first subset of the first set of data points associated with normal calibration data and (2) a second subset of the first set of data points associated with anomalous calibration data. Generating the first set of outputs using the model includes mapping the raw data to the feature space based on the information associated with the set of users and the entity. The raw data is represented as a second set of data points in the feature space. The generating the first set of outputs further includes classifying, using the function, each data point from the second set of data points as normal or anomalous, and generating the first set of outputs based on the classifying.

In some embodiments, the model is a first model, and the calibration datasets further include historical net-to-gross ratio data indicating ratios of net pay to gross pay for the set of users. The method may further include constructing, based on the historical net-to-gross ratio data and the calibration datasets, a second model for determining a net-to-gross ratio. Using the second model and using the raw data, a net-to-gross ratio may be determined for each user from the set of users, and the available balance may be determined for each user from the set of users based on the processed data and the net-to-gross ratio for that user.

In some embodiments, determining the available balance for each user from the set of users includes determining gross earnings for that user for the current time period, determining a level of risk associated with that user based on information associated with that user, and adjusting the gross earnings based on a net-to-gross ratio for that user and the level of risk associated with that user.

In some embodiments, receiving, from the second compute device, user roster data includes information identifying the set of users and direct deposit data associated with the set of users, receiving a request for advance payment from a user, determining, in response to receiving the request, that the user belongs to the set of users based on the user roster data and the direct deposit data, and sending, after determining that the user belongs to the set of users, an instruction to a third compute device to transfer at least a portion of the available balance determined for the user to an account accessible by the user. The third compute device is independent of the first compute device and the second compute device.

In some embodiments, the earnings data includes gross earnings data and net earnings data. The method may further comprise the steps of determining a net-to-gross ratio for each user from the set of users based on the gross earnings data and the net earnings data, and the available balance determined for each user from the set of users based on the processed data and the net-to-gross ratio for that user.

Also described are non-transitory processor-readable mediums storing code representing instructions to be executed by a processor. In general, the code causes the processor to receive calibration datasets including (1) historical time data indicating time worked by a set of users and (2) historical earnings data indicating earnings made by the set of users. The code further causes the processor to construct, based on the calibration datasets, an ensemble model including a group of component models. Each component model from the group of component models implementing a different anomaly detection algorithm. The code further causes the processor to receive, from a compute device associated with an entity, raw data for a current time period that includes (1) time data indicating time worked by the set of users affiliated with the entity and (2) earnings data indicating earnings made by the set of users, identify, using the ensemble model, anomalous time data and anomalous earnings data in the raw data, process the raw data by removing the anomalous time data and the anomalous earnings data, to produce processed data, and determine an available balance for each user from the set of users based on the processed data.

In some embodiments, the group of component models includes a first component model that implements a support vector machine algorithm, and a second component model that implements a local outlier factor algorithm.

In some embodiments, the calibration datasets further include historical net-to-gross ratio data indicating ratios of net pay to gross pay for the set of users. The code may further comprise code to cause the processor to construct, based on the historical net-to-gross ratio data and the calibration datasets, a model for determining a net-to-gross ratio, and determine, using the model and using the raw data, a net-to-gross ratio for each user from the set of users. The code may be configured to cause the processor to determine the available balance including code to cause the processor to determine the available balance for each user from the set of users based on the processed data and the net-to-gross ratio for that user.

In some embodiments, the code to cause the processor to determine the available balance for each user from the set of users includes code to cause the processor to determine gross earnings for that user for the current time period, determine a level of risk associated with that user based on information associated with that user, and adjust the gross earnings based on a net-to-gross ratio for that user and the level of risk associated with that user.

In some embodiments, the compute device is a first compute device, the code further comprising code to cause the processor to receive, from the first compute device, user roster data including information identifying the set of users and direct deposit data associated with the set of users, receive a request for advance payment from a user, determine, in response to receiving the request, that the user belongs to the set of users based on the user roster data and the direct deposit data, and send, after determining that the user belongs to the set of users, an instruction to a second compute device to transfer at least a portion of the available balance determined for the user to an account accessible by the user. The second compute device may be independent of the first compute device.

In some embodiments, the earnings data includes gross earnings data and net earnings data. The code may further comprise code to cause the processor to determine a net-to-gross ratio for each user from the set of users based on the gross earnings data and the net earnings data. The code may be configured to cause the processor to determine the available balance including code to cause the processor to determine the available balance for each user from the set of users based on the processed data and the net-to-gross ratio for that user.

BRIEF DESCRIPTION OF THE DRAWINGS

FIGS. 3A-3H are illustrative graphical user interfaces (GUIs) of an earned income transfer process, according to an embodiment.

DETAILED DESCRIPTION

Figure 1:
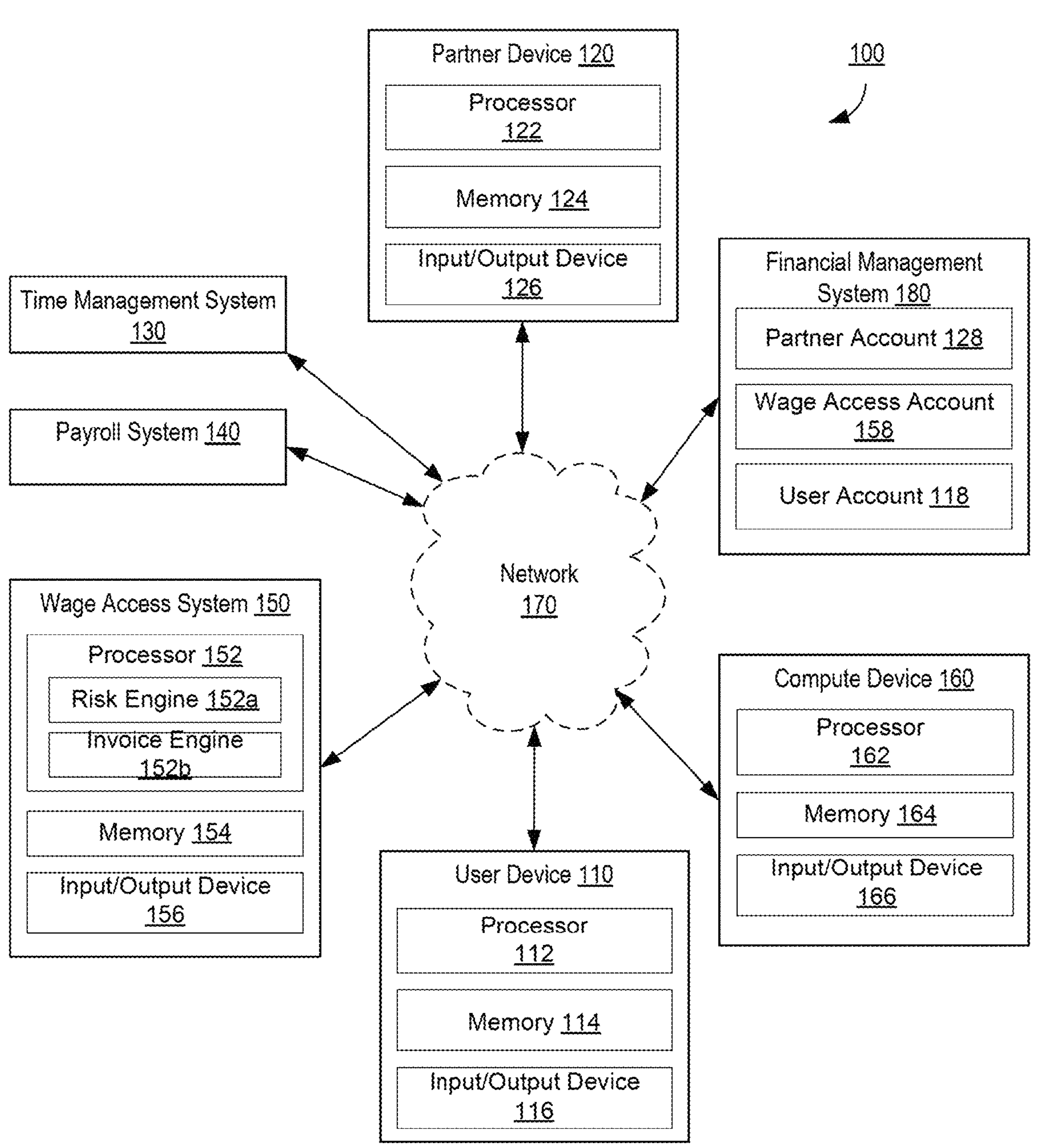
FIG. 1 is a block diagram of a system for processing and providing access to earned income, according to an embodiment.

Described herein are systems, devices, and methods for constructing a machine learning model that processes and provides a user access to earned income on an on-demand basis. In some embodiments, a supervised learning model may be used to classify raw time entry and earnings data as normal or anomalous. For example, a machine learning model may generate a feature space based on calibration data including normal data and anomalous data. A function may be defined that represents a boundary in the feature space between the normal data and anomalous data. Raw data may be input to the machine learning model and mapped into the feature space. An output of the machine learning model may include classification of the raw data between normal data and anomalous data using the function developed by the model. This may improve the accuracy of time entry and earnings data such that errors may be timely identified and resolved prior to payday. Time entry and earnings data processed by the machine learning models describe herein may also improve determination of earned income.

Generally, the systems and methods described herein includes a wage access system configured to calculate an available balance that a user (e.g., employee) may transfer to a predetermined account (e.g., bank account, payroll card, debit card) at any given time. The available balance may be generated based at least in part on an estimation of earned wages after taxes, other deductions, and risk (e.g., user risk, partner risk, data error risk, historical risk). For example, one or more machine learning models may be used to identify anomalous time data and earnings data. The available balance funds are transferred to the user upon request (e.g., the same day) by the wage access system. Funds (up to the available balance) requested and transferred to the user are remitted from the wage access system and not from an employer's funds. That is, the wage access system funds and backs transfers to the user on behalf of the employer. For example, the wage access system may remit the full net pay to an employee prior to receiving corresponding funds from the employer. On payday, the wage access system remits the remaining earned wages to the employee equal to the total net pay (calculated and submitted by the employer) less any previous advances provided by the wage access system within that pay period. On payday, the employer remits the full net pay to the wage access system. Thus, the wage access system funds the user net pay by payday and also receives the user net pay from the employer on payday.

These systems and methods may allow an employee to determine when they receive their earned income while allowing employers to maintain their existing payroll systems and disbursement schedules. For example, an employer may implement a biweekly payroll while an employee may select to receive their wages daily (or on an ad hoc basis) through a wage access system as described in more detail herein. Improved access to earned income may increase employee satisfaction through improved flexibility and financial security. For example, improved access to earned income may enable employees to pay their bills on time, avoid late fees, and meet other financial obligations. Employers may further benefit as higher employee satisfaction may reduce turnover, improve productivity, and increase the attractiveness of an employer.

With the systems and methods described herein the employer may remit user earned wages into a designated account of the wage access system such that the employer remits the full net pay to the user. In this manner, the employer incurs no additional risk associated with prefunding payroll using conventional employer payroll advance methods. Furthermore, the available balance transferred to the user by the wage access system is not a loan as earned income is being transferred.

As used herein, a user may refer to one or more of employee (e.g., full-time, part-time, exempt, non-exempt, commission), a client, worker, a contractor, executive, administrator, profession, salesperson, service provider, trainee, intern, entity, organization, and the like associated with a partner. For example, a user may include a person designated to receive funds from a partner, an administrator in a payroll department, an administrator in human resources, and the like. A partner may refer to one or more of an employer, company, corporation, enterprise, organization, franchise, provider, entity, and the like associated with one or more users (e.g., employees). Available balance as used herein refers to the portion of a user's reported gross earnings that the wage access system makes available to a user for transfer prior to payday for time (e.g., hours) already worked. An advance refers to a portion of a user's available balance that the wage access system transfers to the user prior to payday. In some instances, the wage access system is separate and independent from the partner such that the partner does not own or control the wage access system. Each of the user, the partner, and the wage access system may have separate financial accounts at one or more financial institutions. The financial accounts of the user, the partner, and wage access system can be separate and independent.

Gross earnings are earnings before taxes and deductions are taken out. For some users, gross earning may be calculated by multiplying a user's hourly wage by the number of hours worked. Net earnings are earnings after all taxes and deductions are taken out. A pay cycle or pay period refers to a recurring length of time over which user time is recorded and paid (e.g., bi-weekly, monthly). Payday is the date that a partner remits funds (e.g., net earnings) to the user.

In some instances, the systems described herein include a user device, a partner device, a time management system, a payroll system, and a wage access system. Each of the partner, wage access system, and user may be associated with a respective financial account through which funds may be stored and transferred. The user device may be used to control transfer of earned income and may be configured to communicate with at least the wage access system. The wage access system may be configured to communicate with one or more of the partner device, time management system, payroll system, or user device(s) to facilitate the transfer of funds between the partner and user.

The payroll system is configured to determine and disburse wages from an employer financial account each pay period for the users (e.g., employees) associated with a partner. One or more users may record their time (e.g., hours) worked for the partner using the time management system (TMS). The wage access system is further configured to calculate an available balance of the user based at least in part on an estimation of earned wages after taxes, other deductions, and risk. The available balance may be determined based at least in part on an output of one or more machine learning models. One of or more of the partner device, time management system, and payroll system may generate raw data corresponding to, for example, payroll data, time worked data, employment data, deposit data (e.g., associated with the wage access account), other financial data, account data, and the like. The raw data is transmitted and used by the wage access system to generate the available balance and to initiate fund transfers.

I. Systems

Systems described herein may include one or more of the components used to process and provide access to earned income using the devices as described herein. FIG. 1 is a block diagram of a variation of a system 100. System 100 may be implemented across multiple devices that are each connected to a network 170. As depicted in FIG. 1, system 100 may include one or more compute devices, such as, for example, a user device 110, a partner device 120, a time management system 130, a payroll system 140, a wage access system 150, a financial management system 180, and/or one or more additional compute device(s) 160. It should be understood that system 100 may include any number of compute devices, including more or less compute devices than shown in FIG. 1. The network 170 can include one or more network(s) that may be any type of network (e.g., a local area network (LAN), a wide area network (WAN), a virtual network, a telecommunications network) implemented as a wired network and/or wireless network and used to operatively couple to any compute device.

Each compute device 110, 120, 130, 140, 150, 160, 180 may be any type of device (or group of devices) configured to send data and/or receive data over network 170 from one or more of the other compute devices. Each compute device 110, 120, 130, 140, 150, 160, 180 may include a corresponding processor, memory, and input/output device as described in detail herein. For example, user device 110 includes a processor 112, memory 114, and input/output device 116, as further described below. The memory 114 can store data associated with a wage access application and/or account, e.g., configured to communicate with wage access system 150, as further described with reference to FIGS. 3A-3H. In some embodiments, the memory 114 stores instructions to cause the processor 112 to collect, request, receive, and/or send data to and/or from another compute device (e.g., user information, account information, payment information, transaction objects). In some embodiments, the user device 110 can be a mobile device such as a smartphone, a tablet, a personal computer, etc.

In some embodiments, system 100 can include one or more additional compute device(s) 160 that may correspond to additional user devices, partner devices, wage access systems, and/or financial management systems. The compute device 160 has a processor 162, a memory 164, and an input/output device 166, which may be structurally and/or functionally similar to the processor 112, the memory 114, and the input/output device 114, respectively.

As described in further detail herein, the compute devices in some embodiments are connected to each other via an Internet Service Provider (ISP) and the Internet (e.g., network 170). In some embodiments, a connection can be defined, via network 170, between any two compute devices and financial accounts. As shown in FIG. 1, for example, a connection can be defined between user device 110 and any of time management system 130, payroll system 140, wage access system 150, and compute device 160.

Partner device 120 may be associated with a partner such as an employer, company, entity, enterprise, organization, and the like. Partner device 120 may include or form part of a time management system 130. Partner device 120 may include similar components as other compute devices 110, 120, 130, 140, 150, 160, 180. For example, partner device 120 includes a processor 122, a memory 124, and an input/output device 126, which can be structurally similar to the processor 112, the memory 114, and the input/output device 116, respectively. In some embodiments, the processor 122 of the partner device 120 may be any suitable processing device configured to run and/or execute functions associated with collecting, storing, and/or sending information regarding time worked, wages, and/or other time management information. In some embodiments, the processor 122 of the partner device 120 can be configured to execute instructions that cause the processor 122 to function as a risk engine 152*a* and/or an invoice engine 152*b*. The risk engine 152*a* can use machine learning models and/or algorithms, as further described below with reference to FIG. 6, to evaluate risk and process raw data (e.g., including time worked data, earnings data, etc.). The invoice engine 152*b* can generate gross earnings per user, per pay period, and/or per risk level, and may further determine an available balance for a user at any point in time, as further described with reference to FIG. 2. In some embodiments, the memory 124 includes data associated a time management system.

A user account 118 may be associated with and controlled by a user device 110, a partner account 128 may be associated with and controlled by a partner device 120, and a wage access account 158 may be associated with a user and controlled by the wage access system 150. Each of the accounts 118, 128, 158 may be financial accounts operated by a financial management system 180 (e.g., managed by a financial institution such as a bank). In some embodiments, the wage access account 158 includes a routing number and account number that user wages are transferred into from a partner account 128. On payday, the payroll system 140 of a partner runs payroll such that net pay of at least one user is remitted to the wage access account 158. The wage access account 158 funds the net pay of at least one user by payday such that the wage access system 150 is in a "net advance" position vis-à-vis the partner. In some instances, it is neither necessary nor expected for the wage access system 150 to receive funds from the partner account 128 prior to the net pay of the user being transferred from the wage access account 158 to the user account 118. With methods as described in more detail herein, the net pay of the user is remitted to a user designated account (the wage access account 158) enabling the partner to remit the full net pay to the user.

Compute Devices

Generally, the compute devices described here (e.g., compute devices 110, 120, 130, 140, 150, 160, 180) may include a controller having a processor such as a CPU (e.g., processor 112, 122, 152, 162) and memory (e.g., memory 114, 124, 154, 164), which can include one or more computer-readable storage mediums. The processor may incorporate data received from memory and input to control one or more components of the system (e.g., user device 110, partner device 120, wage access system 150, compute device 160). The memory 114, 124, 154, 164 may further store instructions to cause the processor 112, 122, 152, 162 to execute modules, processes and/or functions associated with the methods described herein. In some embodiments, the memory 114, 124, 154, 164 and processor 112, 122, 152, 162 may be implemented on a single chip. In other embodiments, they can be implemented on separate chips. The compute devices 110, 120, 130, 140, 150, 160, 180 may be configured to receive, compile, store, and access data. In some embodiments, the compute device 110, 120, 130, 140, 150, 160, 180 may be configured to access and/or receive data from different sources. The compute device 110, 120, 130, 140, 150, 160, 180 may be configured to receive data directly input by a user and/or it may be configured to receive data from separate devices (e.g., a smartphone, tablet, computer, database, server) and/or from a storage medium (e.g., flash drive, memory card). The compute device 110, 120, 130, 140, 150, 160, 180 may receive the data through a network connection or through a physical connection with the device or storage medium (e.g., through Universal Serial Bus (USB) or any other type of port). The compute device 110, 120, 130, 140, 150, 160, 180 may include any of a variety of devices, such as a cellular telephone (e.g., smartphone), tablet computer, laptop computer, desktop computer, portable media player, wearable digital device (e.g., digital glasses, wristband, wristwatch, brooch, armbands, virtual reality/augmented reality headset), television, set top box (e.g., cable box, video player, video streaming device), gaming system, or the like.

The compute device 110, 120, 130, 140, 150, 160, 180 may be configured to receive various types of data. For example, the compute device 110, 120, 130, 140, 150, 160, 180 may be configured to receive user employment data (e.g., identification, title, position, hourly rate, employment history), user financial data (e.g., withholding, financial account, deposit data associated with the wage access account, direct deposit data, deductions, beneficiaries, payment information, transaction objects), or any other information that may be relevant to a providing user access to earned income. In some embodiments, the compute device 110, 120, 130, 140, 150, 160, 180 may be configured to create, receive, and/or store user and/or partner profiles. A user and/or partner profile may contain any of the raw data described herein. While the above mentioned information may be received by the compute device 110, 120, 130, 140, 150, 160, 180, in some embodiments, the compute device 110, 120, 130, 140, 150, 160, 180 may be configured to calculate any of the above data from information it has received using software stored on the device itself, or externally.

The processor 112, 122, 152, 162 may be any suitable processing device configured to run and/or execute a set of instructions or code and may include one or more data processors, image processors, graphics processing units, physics processing units, digital signal processors, and/or central processing units. The processors 112, 122, 152, 162 may be any suitable processing device configured to run and/or execute functions associated with requesting, generating, processing, and/or providing access to earned income. For example, the processor 112 may be configured to send a request to transfer an available balance in response to receiving a signal from a user via input/output device 116, and/or cause a signal to be sent to wage access system 150, as described in further detail herein. The processor 112, 122, 152, 162 may be, for example, a general purpose processor, Field Programmable Gate Array (FPGA), an Application Specific Integrated Circuit (ASIC), and/or the like. The processor 112, 122, 152, 162 may be configured to run and/or execute application processes and/or other modules, processes and/or functions associated with the system and/or a network associated therewith. The underlying device technologies may be provided in a variety of component types (e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, and the like.

In some embodiments, the memory 114, 124, 154, 164 may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, and/or the like. The memory 114, 124, 154, 164 may store instructions to cause the processor 112, 122, 152, 162 to execute modules, processes, and/or functions associated with the communication device, such as raw data processing, communication, and/or device settings. Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for the specific purpose or purposes.

Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs), and holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The systems, devices, and/or methods described herein may be performed by software (executed on hardware), hardware, or a combination thereof. Hardware modules may include, for example, a general-purpose processor (or microprocessor or microcontroller), a field programmable gate array (FPGA), and/or an application specific integrated circuit (ASIC). Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

In some embodiments, the compute device 110, 120, 130, 140, 150, 160, 180 may further include a communication interface configured to permit a user and/or partner to control one or more devices of the system. The communication interface may include a network interface configured to connect the compute device 110, 120, 130, 140, 150, 160, 180 to another system (e.g., Internet, remote server, database) by wired or wireless connection. In some embodiments, the communication device may be in communication with other devices via one or more wired and/or wireless networks. In some embodiments, the network interface may include a radiofrequency receiver, transmitter, and/or optical (e.g., infrared) receiver and transmitter configured to communicate with one or more devices and/or networks. The network interface may communicate by wires and/or wirelessly with one or more of the user device, partner device, compute device, financial accounts, network, database, and server.

The network interface may include radiofrequency (RF) circuitry configured to receive and send RF signals. The RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth.

Wireless communication through any of the compute devices 110, 120, 130, 140, 150, 160, 180 may use any of multiple communication standards, protocols and technologies, including but not limited to, Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (WiFi) (e.g., IEEE 802.11a, IEEE 802.11b, IEEE 802.11g, IEEE 802.11n, and the like), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol. In some embodiments, the devices herein may directly communicate with each other without transmitting data through a network (e.g., through NFC, Bluetooth, WiFi, RFID, and the like).

The communication interface may generally include an input/output device such as input/output device 116, 126, 156, 166. The input/output device 116, 126, 156, 166 may be configured to permit a user to control a compute device 110, 120, 130, 140, 150, 160, 180. The input/output device 116, 126, 156, 166 may permit a user to interact with and/or control a compute device 110, 120, 130, 140, 150, 160, 180 directly and/or remotely. For example, an input/output device 116, 126, 156, 166 of the compute device 110, 120, 130, 140, 150, 160, 180 may include an input device for a user to input commands and an output device for a user to receive output. An output device may output user data and financial data associated with the user and may include one or more of a display device and audio device. A display device may permit a user to view their account balance and initiate a transfer of funds. Raw data from one or more compute devices 110, 120, 130, 140, 150, 160, 180 may be received through the network interface and output visually and/or audibly through one or more output devices of the compute device 110, 120, 130, 140, 150, 160, 180. In some embodiments, an output device may include a display device including at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, and/or holographic display.

In some embodiments, the compute device 110, 120, 130, 140, 150, 160, 180 may include an input device (e.g., touch screen) and output device (e.g., display device) and be configured to receive input data from one or more of the user device 110, partner device 120, time management system 130, payroll system 140, wage access system 150, compute device 160, network 170, financial accounts 118, 128, 158, database, and server. For example, user control of an input device (e.g., keyboard, buttons, touch screen) may be received and processed by a processor 112, 122, 152, 162 and memory 114, 124, 154, 164 to output a control signal to one or more compute devices 110, 120, 130, 140, 150, 160, 180. Some embodiments of an input device may include at least one switch configured to generate a control signal. For example, an input device may include a touch surface for a user to provide input (e.g., finger contact to the touch surface) associated with a control signal. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device comprising at least one switch, a switch may comprise, for example, at least one of a button (e.g., hard key, soft key), touch surface, keyboard, analog stick (e.g., joystick), directional pad, mouse, trackball, jog dial, step switch, rocker switch, pointer device (e.g., stylus), motion sensor, image sensor, and microphone. A motion sensor may receive user movement data from an optical sensor and classify a user gesture as a control signal. A microphone may receive audio data and recognize a user voice as a control signal.

Network

In some embodiments, the systems and methods described herein may be in communication with other compute devices 110, 120, 130, 140, 150, 160, 180 via, for example, one or more networks 170, each of which may be any type of network (e.g., wired network, wireless network). The communication may or may not be encrypted. A wireless network may refer to any type of digital network that is not connected by cables. Examples of wireless communication in a wireless network include, but are not limited to cellular, radio, satellite, and microwave communication. However, a wireless network may connect to a wired network to interface with the Internet, other carrier voice and data networks, business networks, and personal networks. A wired network can be implemented using copper twisted pair, coaxial cable and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, and virtual private networks (VPN). Hereinafter, network refers to any combination of wireless, wired, public and private data networks. Such networks can be interconnected through the Internet, to provide a unified networking and information access system. In some embodiments, the compute devices 110, 120, 130, 140, 150, 160, 180 may communicate with each other (e.g., send data to and/or receive data from) and with the network via intermediate networks and/or alternate networks. Such intermediate networks and/or alternate networks can be of a same type and/or a different type of network as network 170. Cellular communication may encompass technologies such as GSM, PCS, CDMA or GPRS, W-CDMA, EDGE or CDMA2000, LTE, WiMAX, and 5G networking standards. Some wireless network deployments combine networks from multiple cellular networks or use a mix of cellular, Wi-Fi, and satellite communication.

II. Methods

Also described here are methods for providing access to earned income using the systems and devices described herein. Generally, the methods described here include receiving a transfer request from a user device to a wage access system. The wage access system determines an available balance for the user based at least in part on raw data (e.g., time worked, hourly wage, account information) obtained from a partner and risk associated with historical data and an output of at least one machine learning model (e.g., time model, earnings model, net-to-gross ratio model, pay period model). In this manner, the available balance may account for risk associated with one or more of the user and partner (e.g., entity). In an embodiment, systems and methods described herein can be implemented as a service (including one or more devices and/or associated software) referred to herein as a wage access system. The wage access system converts user reported time worked into an available balance and allows the user to transfer the desired funds from the available balance to an account and/or card selected by the user such as a bank account, savings account, debit card, charge card, pay card, payroll card, prepaid card, and the like. The wage access system initiates a transfer of funds up to the available balance from a wage access account to a user account. On payday, the wage access system transfers the remaining amount of the user wages for a given pay period to the user account while the partner initiates transfer of user wages to the wage access account. It should be appreciated that any of systems and devices described herein may be used in and/or to execute or implement the methods described herein.

Method of Accessing Earned Income

Figure 2:
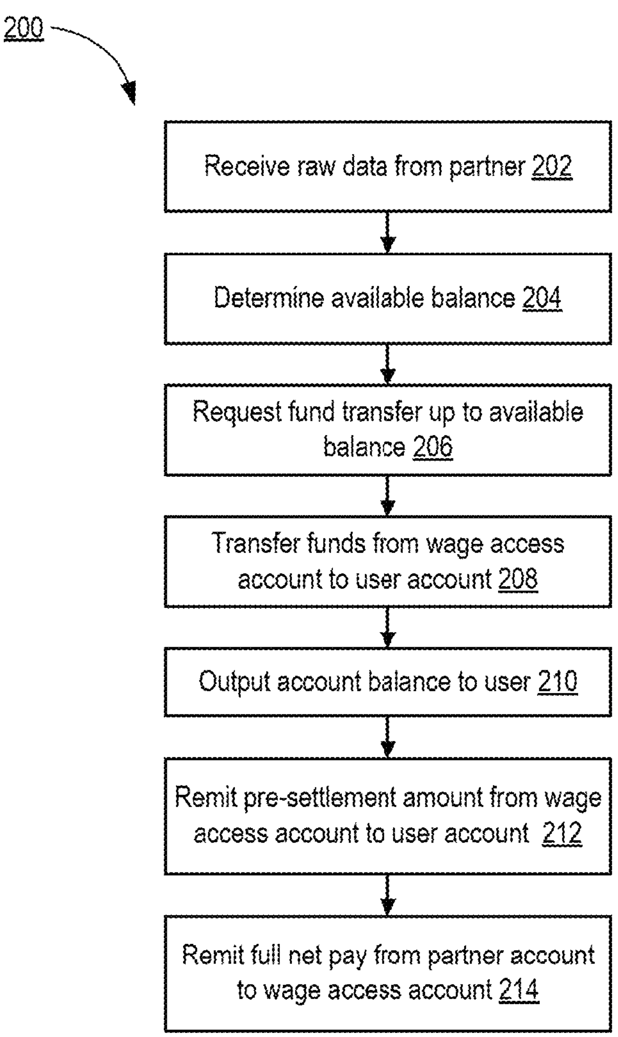
FIG. 2 is a flow chart illustrating a method of processing and providing access to earned income, according to an embodiment.

FIG. 2 is a flowchart that generally describes a wage access process 200. The process 200 may include receiving raw data 202 associated with wage data and time worked data of a user from or on behalf of a partner. For example, one of or more of a partner device (e.g., partner device 120), time management system (e.g., time management system 130), and payroll system (e.g., payroll system 140) may generate raw data associated with, for example, gross earnings data, net earnings data, user roster data, direct deposit data, and the like. The raw data may include time worked and earnings made by a user during one or more time periods (e.g., historical time period, current pay period). For example, a payroll system may be configured to determine and disburse wages (e.g., run payroll) each pay period to the users associated with a partner. The payroll data generated by the payroll system may be transmitted to the wage access system at least once per pay period. One or more users may record their time worked for the partner using a time management system. The raw data is transmitted by one or more of the partner device, time management system, and payroll system to the wage access system (e.g., wage access system 150).

The wage access system (e.g., wage access system 150) determines an available balance of the user 204. The available balance may be calculated based at least in part on an estimation of earned wages after taxes, other deductions, employment history, credit, and risk (e.g., user risk, partner risk, data error risk, historical risk). In some embodiments, the available balance may be determined at step 204 using the received data and an output of one or more machine learning models, as described in more detail herein with respect to FIG. 6. For example, calibration datasets may be used to define a function that is used to identify a portion of the raw data that is anomalous. The raw data may be processed to remove the anomalous data and produce processed data. The available balance may then be determined based on the processed data. The available balance may be calculated at predetermined intervals, such as hourly, daily, etc, and may be updated upon receipt of raw data from a partner, as described in more detail herein. For example, the available balance may be based at least in part on the current amount of earned income of a user after taxes and other deductions.

Prior to payday, a user via a user device (e.g., user device 110) may request the wage access system to transfer funds to the user account of a predetermined amount up to the available balance, at 206. The request may also designate a specific financial account from among a group of user accounts. For example, the requested funds may be remitted to a bank account linked to one or more of a debit card, paycard, and prepaid debit card. This type of transfer may be facilitated by a debit card network (e.g., Visa Direct, Mastercard Send™) and may be processed substantially immediately through a payment vendor (e.g., Fiserv). Additionally or alternatively, a user may select to remit funds via an automated clearing house (ACH) network. For example, the wage access system may remit funds for a set of users via batch ACH for completion the next business day.

The wage access system transfers the requested funds from the wage access account to the user account, at 208. In some embodiments, a transaction fee may be charged to the user when transfer of earned income is requested prior to payday. For example, a user that requests transfer of their earned income at the end of every working day may be charged a fee (e.g., flat fee, percentage fee) for every working day. In other embodiments, a user may be charged a recurring subscription fee. In other embodiments, a combination of transaction and subscription fees may be charged. Fees charged may be paid by a user, partner, and combinations thereof. In some embodiments, a user may schedule automatic fund transfers of their available balance on a predetermined basis (e.g., daily, halfway to payday). The account balance may be received and output by the user device 210 to confirm completion of fund transfer.

On payday, the wage access system may remit a pre-settlement amount from the wage access account to the user account 212. The pre-settlement amount corresponds to net pay of the user less any previous advances and/or fees for a pay period. In some embodiments, the pre-settlement amount may be remitted by ACH the night prior to payday. Accordingly, by payday, the user has received their full net pay. On payday, the partner may remit the full net pay of a user from the partner account to the wage access account 214.

Figures 3A, 3B:
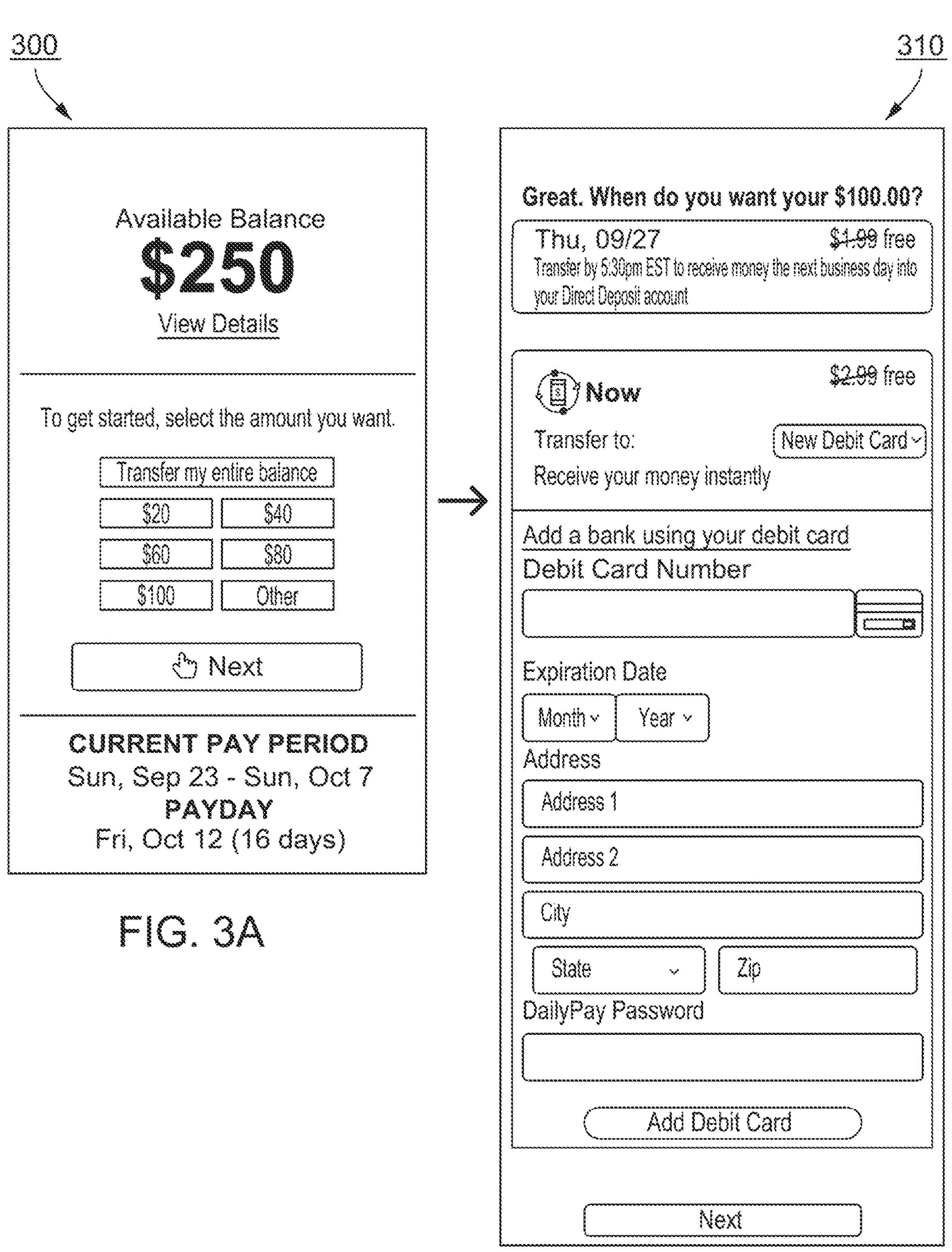

FIGS. 3A-3H are illustrative graphical user interfaces that illustrate a wage access process, e.g., implemented via an application associated with a wage access system (e.g., wage access system 150) installed on a user device (e.g., user device 110). In response to a user request to transfer earned income prior to payday, a compute device (e.g., user device such as user device 110) may display a GUI 300 that may include an available balance and the amount of funds to transfer up to the available balance. The available balance may be determined by a wage access system and received by the user device. The available balance may be received and/or updated on a predetermined basis, such as daily, hourly, real-time, and the like. The GUI 300 may include additional information such as pay period data, payday data, gross earnings data, net earnings data, direct deposit data, financial account data, balance data, time worked, and the like. FIG. 3F illustrates a GUI 350 similar to GUI 300 that includes additional information such as balance data and tutorial information. For example, a user may view detailed available balance data such as shown in GUI 360 of FIG. 3G including amounts of earned income previously transferred within the pay period. GUI 370 of FIG. 3H illustrates a payday example showing a pre-settlement amount ($300) calculation based on earned income minus any previous advances and fees.

Figure 4:
FIG. 4 is an illustrative GUI of an income statement, according to an embodiment.
Figure 4:
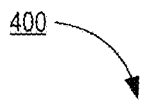
Figure 4:
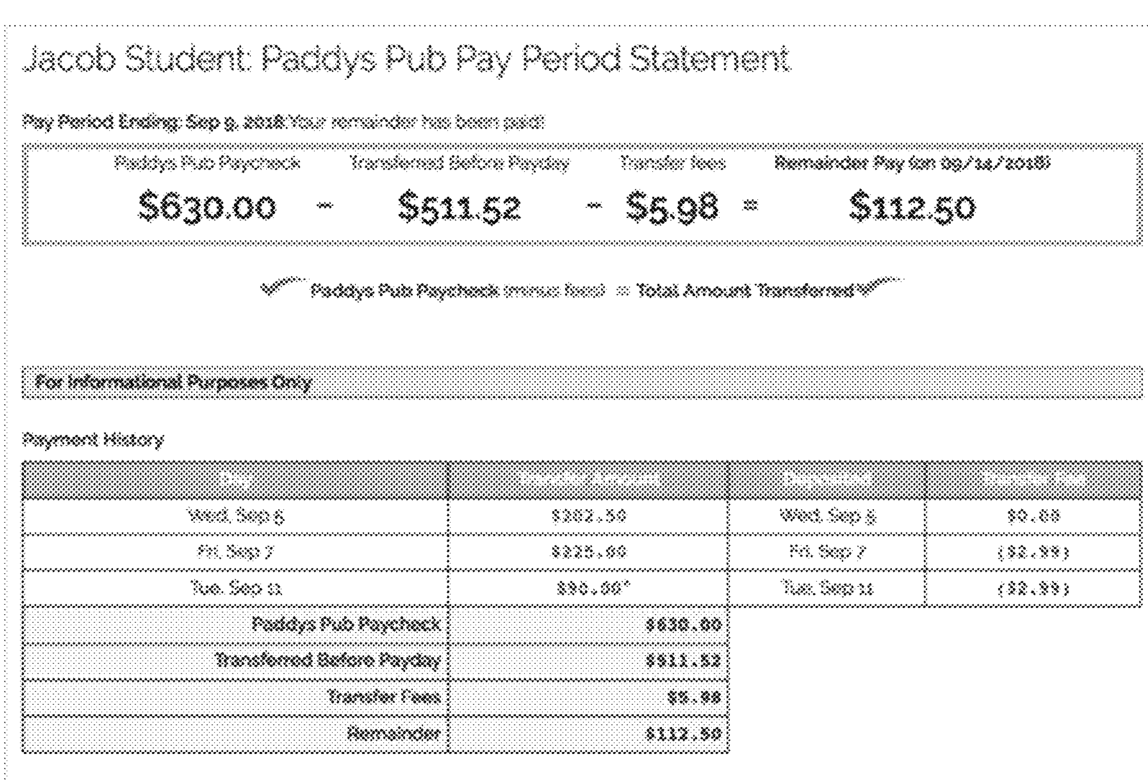

The user may be presented a set of fund transfer options based on the determined available balance on GUI 300. Once a user inputs an amount of earned income to transfer (e.g., $100 of a $250 available balance), the compute device 110 may display a GUI 310 requesting a financial account for funds transfer. For example, the user may select a predesignated account or may enter account information for a new financial account (e.g., new debit card). The GUI 310 may include additional information such as estimated transfer completion date, fee data, and the like. The compute device 110 may display a GUI 320 requesting that the user confirm the fund transfer. The GUI 320 may include the amount of funds to transfer, fees, account data, and the like. Optionally, the compute device 110 may display a GUI 330 indicating a transfer in process upon reception of user confirmation to initiate funds transfer. The compute device 110 may display a GUI 340 confirming funds transfer and may include transfer data, account data, fee data, pay period data, payday data, balance, time worked, and the like. An illustrative GUI 400 is shown in FIG. 4 of a user pay period statement that may be displayed on a compute device 110. The GUI 400 may include payment history and corresponding calculations.

An example wage transfer process is described below to illustrate one variation of a wage access process. In this example, a user employed by a partner is paid on a weekly pay every Friday where the net pay is $500. On Monday, the user logs enough hours of work to a time management system such that a wage access system calculates an available balance of $100. The user reviews the available balance on a compute device 110 and requests transfer of the $100 into a predesignated user account. The wage access system receives the transfer request and funds the transfer of $100 from a wage access account to the user account (e.g., debit card) as an advance. That is, the wage access system funds transfers to the user off its own balance sheet. On payday, as shown in Table One below, the wage access system funds $400 (the pre-settlement amount) from the wage access account to the user account such that the user receives their full net pay by payday. Separately on Friday, the partner remits the user net pay of $500 to the wage access account such that the wage access system receives back funds transferred to the user for that pay period.

TABLE One

| | User Action | Wage Access System Action | User Balance | Wage Access System Balance |
|---|---|---|---|---|
| Monday | Requests $100 from user device | Funds $100 to user | +$100 | $(100) |
| Thursday (Pre-Settlement) | | Funds $400 to user | +$400 ($500 total) | |
| Friday (Payday) | | | +$500 | $(500) |

Method of Determining Available Balance

As described herein, available balance is the amount of funds that are available to a user to transfer to a user account (e.g., personal bank account, debit card) before payday. The available balance does not represent payment of payroll and is not a substitute for the actual final payroll amount. A user may review their available balance at any time using a compute device 110. The available balance determination balances the earned income of the user less any deductions against risk and other parameters to ensure that the user does not receive more than their net pay within each pay period. For example, the available balance may be determined at least in part on an output of at least one machine learning model.

In systems including one or more of a wage access system, time management system, and/or payroll system, a set of raw data (e.g., user data) may be used to determine an available balance. In some of these embodiments, the raw data may be transmitted to a wage access system at a predefined interval (e.g., hourly, daily, weekly). Generally, the raw data allows the wage access system to authenticate a user, enable calculation of an available balance and pre-settlement amount, and enable compliance with payroll requirements. In some embodiments, raw data may include user roster data, gross earnings data, net earnings data, and direct deposit data. As described in more detail herein with respect to FIG. 6, available balance determination may incorporate one or more machine learning models.

Figure 5:
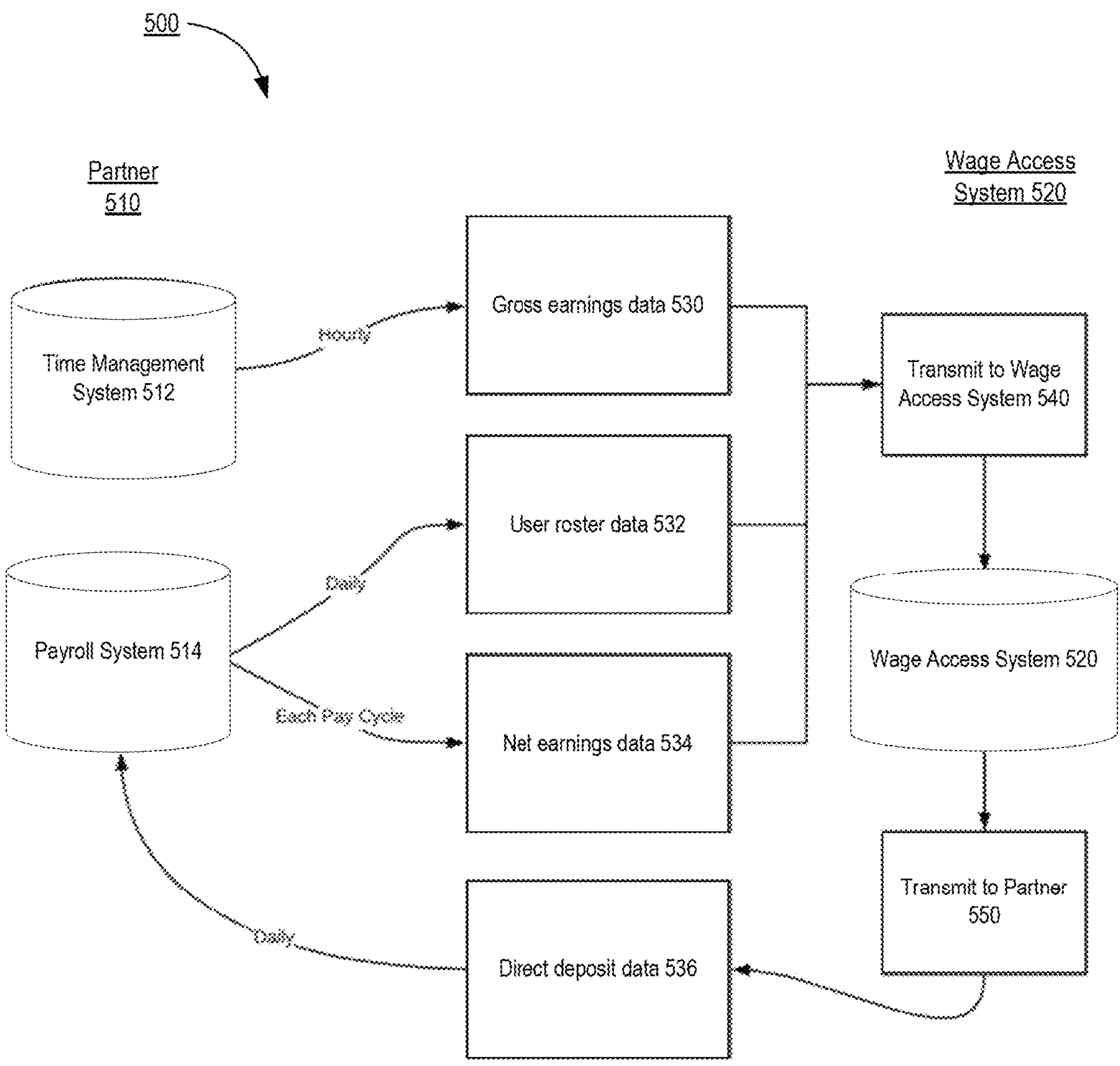
FIG. 5 is an illustrative block diagram of data exchange between an institution and wage access system, according to an embodiment.

FIG. 5 is a block diagram of data exchange 500 between a partner 510 and wage access system 520. The partner 510 and the wage access system 520 can be structurally and/or functionally similar to the partner 120 and/or wage access system 150 depicted and described in relation to FIG. 1. The partner 510 may include and/or be in communication with a time management system 512 and payroll system 514. The time management system 512 and payroll system 514 may be configured to generate and transmit 540 gross earnings data 530, user roster data 532, and net earnings data 534 to the wage access system 520. The gross earnings data 530 and net earnings data 534 may correspond to raw data such as raw data for a current pay period that includes timed worked and earnings made by a set of users. The wage access system 520 may be configured to generate and transmit 550 direct deposit data 536 to the payroll system 514.

Gross earnings data 530 may be generated by the partner 510 (e.g., partner device, payroll system, time management system) and may include the gross earnings of a set of users for a predetermined time period (e.g., one or more pay periods). The gross earnings data 530 may be used to calculate the available balance and therefore determine the availability of funds to a user. The gross earnings data 530 generated by the time management system 512 may be received by the wage access system 520 on, for example, an hourly or daily basis. The wage access system 520 may be configured to prohibit fund transfers to one or more users if the gross earnings data 530 is not updated by the partner 510 on a predetermined basis.

User roster data 532 may be generated by the partner 510 (e.g., partner device, payroll system, time management system) and may include a list of active users associated with the partner 510, their associated user identification, and financial account data (e.g., last four digits of a bank account). The user roster data 532 may be used to create and authenticate user accounts in the wage access system 520, as well as to verify financial account data. The user roster data 532 may be received by the wage access system 520 daily (e.g., at the end of each business day). The wage access system 520 may be configured to prohibit fund transfers to users if the user roster data 532 is not updated by the partner 510.

Net earnings data 534 (e.g., payroll data, payroll register) may be generated by the partner 510 (e.g., partner device, payroll system, time management system) and may include the net earnings that a set of users will receive on payday via the wage access system 520 for a pay period. The net earnings data 534 may be used to calculate the pre-settlement amount and ensure that each user receives their full earnings on payday. The net earnings data 534 is generated by the payroll system 514 after processing payroll and provided to the wage access system 520 prior to payday. For example, the net earnings data 534 generated by the payroll system 514 may be transmitted 540 at least one business day before payday. The wage access system 520 may prohibit fund transfers to users if the net earnings data 534 is not updated by the partner 510. In some instances, the net earnings data 534 may be required for the wage access system 520 to transfer the pre-settlement amount on payday.

Direct deposit data 536 may be generated by the wage access system 520 and include financial account data for new users of the wage access system 520. For example, each new user may be linked to a corresponding wage access account in the direct deposit data. The wage access system 520 may transmit 550 the direct deposit data 536 to the partner 510 (e.g., partner device, payroll system) such that the payroll system 514 may update the direct deposit of record with the direct deposit data. The direct deposit data 536 may ensure the payroll system 514 correctly directs user funds to the direct deposit account of the wage access system 520 as authorized by the user. This enables the wage access system 520 to receive earned income from the partner 510 on behalf of the user. The direct deposit data 536 may be transmitted to the payroll system 514, for example, prior to processing payroll such as after a pay period ends.

In some embodiments, the raw user data (e.g., gross earnings data, user roster data, net earnings data, direct deposit data) may be transmitted using, for example, one or more of a website (e.g., wage access system portal website), Secure File Transfer Protocol (SFTP), and an Application Programming Interface (API).

An example available balance determination process is described below to illustrate one variation of a wage access process. In some embodiments, the partner (e.g., time management system) transmits raw data including unapproved time worked data (see Table Two) to the wage access system. The available balance may be updated as updates and/or corrections to time worked data is received by the wage access system.

TABLE Two

| User ID | Shift Date | Start | End | Hours | Earnings |
|---|---|---|---|---|---|
| 235446 | Jun. 6, 2019 | 9:03 am | 5:15 pm | 8.24 | $86.35 |
| 235446 | Jun. 7, 2019 | 10:15 am | 6:01 pm | 7.76 | $80.01 |

In some embodiments, the raw data (e.g., net earnings data) may include one or more of an hours limit and earnings limit (e.g., shift exclusion) in order to prevent fund transfers based on erroneous shifts (e.g., an employee forgets to clock in or out). For example, if one or more of the time worked and earnings for a shift (e.g., unit of work) exceeds predetermined thresholds, then the time worked for that shift may be excluded from the available balance determination. Each shift may be associated with a pay period. In some embodiments, a risk engine may use a machine learning model (e.g., machine learning time model) to generate an output that classifies a shift for inclusion or exclusion in the available balance determination as described in more detail herein.

A pay period may correspond to a current pay period, an unsettled pay period that has ended without the user receiving their net pay, and/or a settled pay period that has ended with the user receiving their net pay. For example, if the net earnings of an uncategorized pay period corresponds to a previous deposit, then the pay period may be classified with the same pay period given to the previous deposit. In some embodiments, a pay period may have a default classification of settled pay period if the user has not been terminated off-cycle. The pay period may be classified as a settled pay period if the user has been terminated off-cycle and is owed backpay. In some embodiments, a machine learning model (e.g., machine learning pay period model) may generate an output to classify a pay period in the available balance determination as described in more detail herein.

In some embodiments, the raw data may include a pay period exclusion limit to prevent fund transfers based on miscalculations. For example, if the net earnings for a pay period exceeds a pay period exclusion limit, then the net earnings for that pay period may be excluded. Net earnings from a previous pay period may be used. In some embodiments, an invoice engine may use a machine learning model (e.g., machine learning pay period model) to generate an output that classifies gross earnings of a pay period for inclusion or exclusion in the available balance determination. Similarly, in some embodiments, a machine learning model (e.g., machine learning net-to-gross ratio model) may generate an output to classify a shift for inclusion or exclusion in the available balance determination.

Total gross earnings available may refer to a total amount of available gross earnings summed across the current and unsettled pay periods. In some embodiments, an available balance may be calculated by multiplying the total gross earnings by an advance rate, as described herein.

In some embodiments, the advance rate may be based at least in part on a predetermined error rate in user submitted time-sheets and deductions applicable to the user (e.g., taxes, insurance, garnishments). The advance rate may be updated on a predetermined basis (e.g., each pay period) to reflect changes in, for example, deductions. For the sake of example, an initial advance rate may be set between about 50% and 100%. For example, the initial advance rate may be set to 50% and 80% and may be based on the accuracy of partner record keeping and deductions. Thereafter, the advance rate may be updated according to equation (1):

$$[\text{Initial advance rate}]*\text{Percentile}_{25}\left(\frac{\text{Net pay }[0]}{\text{Gross Pay }[0]}, \frac{\text{Net pay }[-1]}{\text{Gross Pay }[-1]}, \frac{\text{Net pay }[-2]}{\text{Gross Pay }[-2]}\right) \quad (1)$$

An example available balance determination process is described below to illustrate one variation of a wage access process. For the sake of example, the user has a weekly pay period from Monday to Sunday with a Friday payday where the user (employee ID 939523) has an hours exclusion limit of 15 hours, an earnings exclusion limit of $200 and pay period exclusion limit of $1,000. The partner submits the raw data in Table 3 for the user on Sep. 14, 2019.

TABLE Thre

| Employee ID | Date | Hours | Earnings |
|---|---|---|---|
| 939523 | Sep. 2, 2019 | 3.2 | 38.52 |
| 939523 | Sep. 3, 2019 | 1.2 | 14.44 |
| 939523 | Sep. 4, 2019 | 4.6 | 55.12 |
| 939523 | Sep. 6, 2019 | 3.2 | 38.89 |
| 939523 | Sep. 7, 2019 | 1.0 | 11.48 |
| 939523 | Sep. 9, 2019 | 10.6 | 127.4 |
| 939523 | Sep. 11, 2019 | 16.3 | 195.23 |
| 939523 | Sep. 12, 2019 | 4.3 | 51.11 |
| 939523 | Sep. 13, 2019 | 1.1 | 12.96 |

The shift corresponding to Sep. 11, 2019 in Table Four is excluded because it exceeds the hours exclusion limit of 15 hours.

TABLE Four

| Employee ID | Date | Hours | Earnings |
|---|---|---|---|
| 939523 | Sep. 2, 2019 | 3.2 | 38.52 |
| 939523 | Sep. 3, 2019 | 1.2 | 14.44 |
| 939523 | Sep. 4, 2019 | 4.6 | 55.12 |
| 939523 | Sep. 6, 2019 | 3.2 | 38.89 |
| 939523 | Sep. 7, 2019 | 1.0 | 11.48 |
| 939523 | Sep. 9, 2019 | 10.6 | 127.4 |
| 939523 | Sep. 12, 2019 | 4.3 | 51.11 |
| 939523 | Sep. 13, 2019 | 1.1 | 12.96 |

The wage access system allocates earnings to a corresponding pay period in Table Five.

TABLE Five

| Employee ID | Date | Hours | Earnings | Pay Period |
|---|---|---|---|---|
| 939523 | Sep. 2, 2019 | 3.2 | 38.52 | Settled Pay Period Ending 9/4 |
| 939523 | Sep. 3, 2019 | 1.2 | 14.44 | Settled Pay Period Ending 9/4 |
| 939523 | Sep. 4, 2019 | 4.6 | 55.12 | Settled Pay Period Ending 9/4 |
| 939523 | Sep. 6, 2019 | 3.2 | 38.89 | Unsettled Pay Period Ending 9/11 |
| 939523 | Sep. 7, 2019 | 1.0 | 11.48 | Unsettled Pay Period Ending 9/11 |
| 939523 | Sep. 9, 2019 | 10.6 | 127.4 | Unsettled Pay Period Ending 9/11 |
| 939523 | Sep. 12, 2019 | 4.3 | 51.11 | Current Pay Period Ending 9/18 |
| 939523 | Sep. 13, 2019 | 1.1 | 12.96 | Current Pay Period Ending 9/18 |

From Table Five, the total gross earnings ($241.84) includes the sum of the unsettled pay period ($177.77) and current pay periods ($64.07). The total gross earnings meets the pay period exclusion criteria. The advance rate (50%) is applied to the total gross earnings ($241.81) to calculate the available balance ($120.92).

Machine Learning

In some embodiments, an available balance may be determined (e.g., step 204 of FIG. 2) in part based on analyzing the overall pattern of multiple data parameters (e.g., time worked data, earnings data, payroll data) with machine learning techniques. For example, a machine learning time model may be calibrated using calibration datasets including historical time worked and earnings data (e.g., shift data) for one or more of a specific user, a group of similar users, users of a partner, and users of an industry, and the like. The calibration data may include normal data and anomalous data, which may not be labeled when used to calibrate an unsupervised machine learning model. In some embodiments, the anomalous training data may be used to calibrate the sensitivity of the machine learning model. The machine learning time model may output a shift classification (e.g., include, exclude). Various machine learning algorithms may be implemented, including classification algorithms, regression algorithms, neural network algorithms, supervised learning models, unsupervised learning models, decision trees, random forests, and the like. By applying a machine learning algorithm to calibration data, relationships may be developed and embodied in the model. Furthermore, the calibrated machine learning model may be tested and iterated upon by using data of the same type as the calibration data. Accordingly, various data parameters may be analyzed (e.g., with a calibrated model as described herein) to generate one or more outputs used to determine an available balance. The models described herein may be calibrated using calibration data including a set of anomalies including time entry errors, wrong time periods, calculation errors, communication errors (e.g., duplicates, corrupted data) and the like. Although specific examples are discussed herein, it should be understood that it is possible to calibrate a machine learning model using any suitable calibration data for any suitable data parameter.

Figure 6:
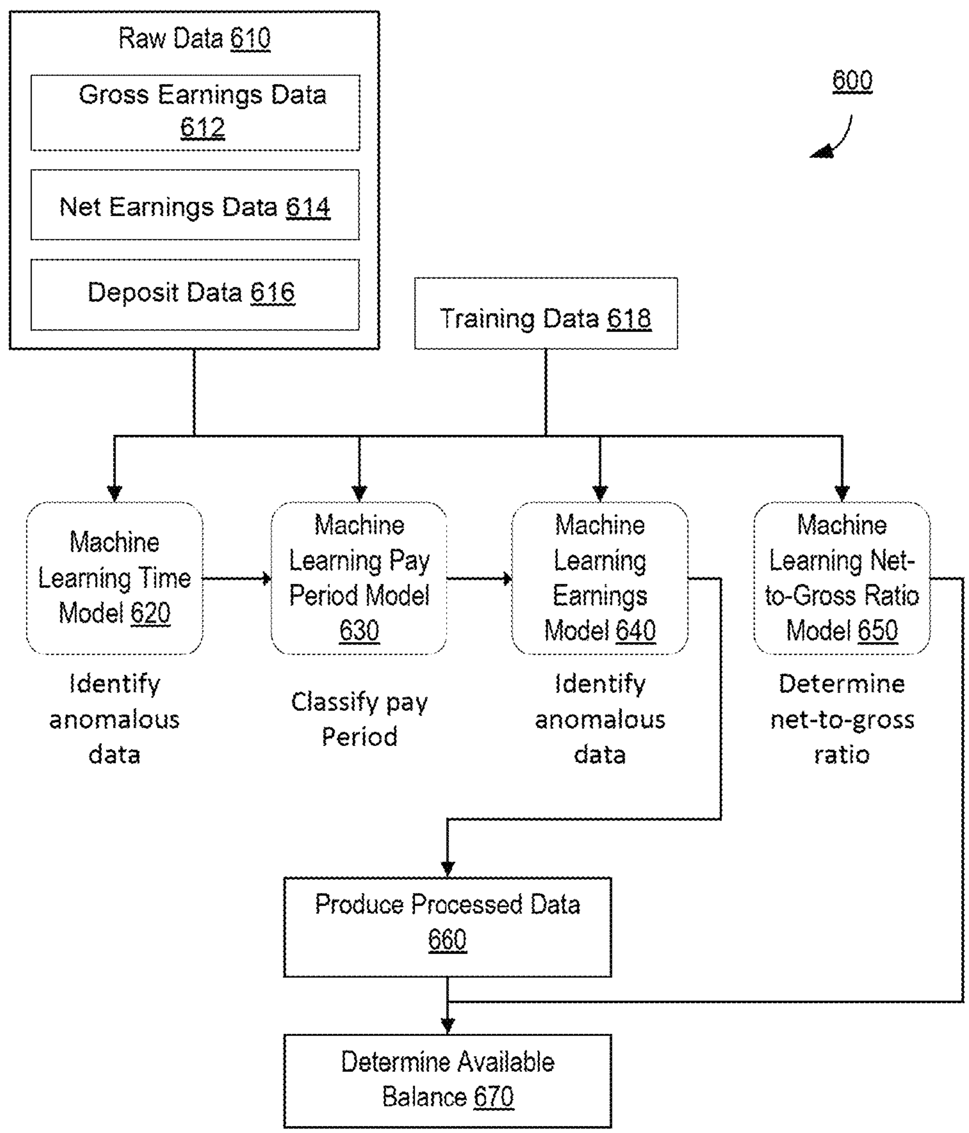
FIG. 6 is a flow chart illustrating a method of determining an available balance using machine learning models, according to an embodiment.

FIG. 6 is a flowchart that generally describes an available balance determination process 600. In some embodiments, the available balance determination step 204 in FIG. 2 may include one or more of the steps of process 600. The process 600 may include receiving raw data 610 corresponding to gross earnings data 612, net earnings data 614, and deposit data 616. Raw data 610 may be associated with at least a current pay period of time worked and earnings made by a set of users. The raw data 610 may be processed by one or more of a risk engine and an invoice engine using one or more machine learning models including a machine learning time model 620, machine learning pay period model 630, machine learning earnings model 640, and/or machine learning net-to-gross ratio model 650. Each of the machine learning models 620, 630, 640, 650 may be calibrated on a set of calibration data 618 that may include normal data and anomalous data of time worked and earnings made by users during a group of historical periods.

One or more of the machine learning models may be configured to generate a feature space including a first set of data points associated with the calibration data. A function may be defined that represents a boundary in the feature space between data points from the first set of data points associated with the normal calibration data and data points from the first set of data points associated with the anomalous calibration data. A feature space may be generated including a first set of data points associated with the training data. A portion of the raw data may be identified as anomalous based at least in part on the subset of data points identified using the function. For example, data points from calibration data may be plotted on a feature space with a boundary (e.g., plane defined by a function) separating the normal data points from the anomalous data points. In some embodiments, a function may be fit to the data based on features associated with the normal calibration data and the abnormal calibration data. The function may be linear or non-linear. The accuracy of the function may be validated by inputting a set of training/testing data not used in generating the function. Once the validity of the function has been satisfied, raw data may be mapped into the feature space and their location relative to the boundary (e.g., plane) may be used to classify the raw data points as normal or anomalous.

The machine learning time model 620 may be configured to identify anomalous time worked and earnings per shift for each user based on the gross earnings data 612. The machine learning pay period model 630 may be configured to classify each pay period as a current pay period, unsettled pay period, and settled pay period based on the net earnings data 614 and deposit data 616. Furthermore, if the net earnings of an uncategorized pay period are associated with a previous deposit, then the pay period may be classified with the same pay period given to the previous deposit. In some embodiments, a pay period may have a default classification of settled pay period if the user has not been terminated off-cycle. The pay period may be classified as a settled pay period if the user has been terminated off-cycle and is owed backpay.

The machine learning earnings model 640 may be configured to identify anomalous gross earnings per pay period for each user based on the gross earnings data 612. The machine learning net-to-gross ratio model 650 may be configured to determine anomalous net-to-gross ratios per pay period for each user based on the gross earnings data 612 and the net earnings data 614.

Processed data may be produced 660 by processing the raw data to remove the portion of the raw data that is anomalous from at least one of the machine learning models 620, 630, 640. For example, earnings from a pay period having time (e.g., hours) identified as anomalous may be excluded from an available balance determination. An available balance may be determined 670 for each user from the set of users based on the processed data, other information provided by a machine learning model (e.g., machine learning model 650) and/or other information provided by a partner (e.g., via a partner device, payroll system, and/or time management system). For example, the available balance may be calculated using equation (1). In some embodiments, the available balance can also be adjusted based on additional information including, for example, historical time and attendance error rate data.

In some embodiments, a processor 112, 122, 152, 162 may be configured to receive calibration datasets including (1) historical time data indicating time worked by a set of users and (2) historical earnings data indicating earnings made by the set of users, the calibration datasets including normal and anomalous data. A first model may be constructed for identifying anomalous time data based on the historical time data. A second model for identifying anomalous earnings data may be constructed based on the historical earnings data. Raw data for a current time period may be received from a compute device 110, 120, 130, 140, 150, 160, 180 associated with an entity that includes (1) time data indicating time worked by the set of users affiliated with the entity and (2) earnings data indicating earnings made by the set of users. Anomalous time data and anomalous earnings data may be identified in the raw data using the first model and the second model. The raw data may be processed by removing the anomalous time data and the anomalous earnings data, to produce processed data. An available balance for each user from the set of users may be determined based on the processed data.

In some embodiments, the processor 112, 122, 152, 162 may be configured to construct the first model by mapping the historical time data to a feature space based on information associated with the set of users and the entity. The historical time data may be represented as a first set of data points in the feature space. A function may be defined that represents a boundary in the feature space between (1) a first subset of the first set of data points representing historical time data associated with calibration data that is normal and (2) a second subset of the first set of data points representing historical time data associated with calibration data that is anomalous. The processor 112, 122, 152, 162 may be configured to identify, using the first model, the anomalous time data in the raw data by mapping the time data to the feature space based on the information associated with the set of users and the entity. The time data may be represented as a second set of data points in the feature space. A subset of the second set of data points may be identified using the function that is in a region of the feature space that includes the second subset of the first set of data points.

In some embodiments, the first model is an ensemble model that combines (1) a first output from a support vector machine learning model and (2) a second output from a local outlier factor calculation, to produce a combined output for identifying anomalous time data.

In some embodiments, the processor 112, 122, 152, 162 may be further configured to calculate aggregated time data by aggregating, for each user from the set of users, time data of that user, aggregating, for each subset of users from the set of users sharing one or more characteristics, time data of one or more users within that subset, and aggregating the time data across the set of users. The processor 112, 122, 152, 162 may be configured to identify, using the first model, the anomalous time data based on the aggregated time data.

In some embodiments, the calibration datasets may further include historical net-to-gross ratio data indicating ratios of net pay to gross pay for the set of users. The processor 112, 122, 152, 162 may be further configured to construct, based on the historical net-to-gross ratio data and classification of the calibration datasets, a third model for determining a net-to-gross ratio. A net-to-gross ratio for each user from the set of users may be determined using the third model and using the raw data. The processor 112, 122, 152, 162 may be configured to determine the available balance for each user from the set of users based on the processed data and the net-to-gross ratio for that user.

In some embodiments, the processor 112, 122, 152, 162 may be configured to determine the available balance for each user from the set of users by determining gross earnings for that user for the current time period, determining a level of risk associated with that user based on information associated with that user, and adjusting the gross earnings based on a net-to-gross ratio for that user and the level of risk associated with that user.

In some embodiments, the compute device 110, 120, 130, 140, 150, 160, 180 is a first compute device, and the processor 112, 122, 152, 162 is further configured to receive, from the first compute device, user roster data including information identifying the set of users and direct deposit data associated with the set of users. A request may be received for advance payment from a user. In response to receiving the request, a determination that the user belongs to the set of users may be made based on the user roster data and the direct deposit data. After determining that the user belongs to the set of users, an instruction may be sent to a second compute device to transfer at least a portion of the available balance determined for the user to an account accessible by the user, the second compute device being independent of the first compute device.

In some embodiments, the earnings data includes gross earnings data and net earnings data. The processor 112, 122, 152, 162 may be further configured to determine a net-to-gross ratio for each user from the set of users based on the gross earnings data and the net earnings data. The processor 112, 122, 152, 162 may be further configured to determine the available balance for each user from the set of users based on the processed data and the net-to-gross ratio for that user.

Machine Learning Time Model

In some embodiments, anomalous time worked may be identified and excluded through a machine learning time model (e.g., machine learning time model 620 as depicted in FIG. 6) constructed using a suitable machine learning algorithm. For example, a machine learning time model may be constructed using a supervised or unsupervised machine learning algorithm such as a K-nearest neighbors, Principle Component Analysis (PCA), vector machine, neural network algorithm, decision trees, random forests, and/or the like. In some embodiments, a machine learning time model may be constructed using one or more of a One-Class Support Vector Machine (SVM) and a Local Outlier Factor (LOF). In some embodiments, the calibration data may include a set of historical time data, such as shift data (e.g., time worked and earnings for a shift) or pay period data (e.g., time worked during a pay period including multiple shifts). The time data may correspond to and be categorized by one or more user characteristics including position, employment history, experience, geography, performance, partner, industry, age, gender, and the like, such that a user may be grouped with a similar set of users. In some embodiments, the time data can be aggregated by user, by groups of user (e.g., sets of users) having or sharing one or more characteristics, and for a partner overall. For example, current time data of a user may be input to the calibrated machine learning time model and used to generate an output of a determination to include or exclude the user time data from the subsequent available balance determination. In this manner, a portion of the received raw data (e.g., time worked by a set of users) may be identified as anomalous and then processed such as by removing the portion of the raw data that is anomalous to produce processed data. The available balance may be determined based on the processed data.

In some embodiments, two layers of anomaly detection may be applied. The first layer of anomaly detection may identify anomalous data at a shift level, and the second layer of anomaly detection may identify anomalous data at a pay period level (e.g., a period including a plurality of shifts). The two layers of anomaly detection may be implemented with the same or different machine learning models. For example, a first model calibrated based on shift data may be used to detect or identify anomalous shift data, and a second model calibrated based on pay period data may be used to detect or identify anomalous pay period data.

Machine Learning Earnings Model

In some embodiments, anomalous gross earnings for a pay period may be identified and excluded through a machine learning earnings model (e.g., machine learning earnings model 640 as depicted in FIG. 6) constructed using a suitable machine learning algorithm. For example, a machine learning earnings model may be constructed using a supervised or unsupervised machine learning algorithm such as a vector machine, neural network algorithm, decision trees, and the like. In some embodiments, a machine learning earnings model may be constructed using one or more of a One-Class Support Vector Machine (SVM) and a Local Outlier Factor (LOF). In some embodiments, the calibration data may include a set of historical invoice data including earnings per pay period. The earnings data may correspond to and/or be categorized by one or more user characteristics including as position, tenure, experience, geography, performance, partner, industry, age, gender, and the like, such that a user may be grouped with a similar set of users. For example, current invoice data of a user may be input to the machine learning earnings model and used to generate an output of a determination to include or exclude the user invoice data from the subsequent available balance determination. In this manner, a portion of the received raw data (e.g., earnings made by a set of users) may be identified as anomalous and then processed such as by removing the portion of the raw data that is anomalous to produce processed data. The available balance may be determined based on the processed data.

Machine Learning Net-to-Gross Ratios Model

In some embodiments, anomalous net-to-gross ratios for a pay period may be identified and excluded through a machine learning net-to-gross ratios model (e.g., machine learning net-to-gross ratio model 650 as depicted in FIG. 6) constructed using a suitable machine learning algorithm. For example, a machine learning net-to-gross ratios model may be constructed using a supervised or unsupervised machine learning algorithm. In some embodiments, a machine learning earnings model may be constructed using a linear regression algorithm. In some embodiments, the calibration data may include a set of historical net earnings and gross earnings data used to calculate the net-to-gross ratios. In some embodiments, the net-to-gross ratios data may correspond to and be categorized by one or more user characteristics including as position, tenure, experience, geography, performance, partner, industry, age, gender, and the like, such that a user may be grouped with a similar set of users. For example, current raw data of a user may be input to the machine learning net-to-gross model and used to generate an output of a determination of a net-to-gross ratio for that user. The net-to-gross ratio determined for that user can then be used to determine an available balance for that user, e.g., by adjusting total gross earnings of the user based on hours worked by the user into net earnings.

Machine Learning Pay Period Model

In some embodiments, each shift entered by a user may be classified with a pay period type (e.g., current, unsettled, settled) through a machine learning pay period model constructed using a suitable machine learning algorithm. As described herein, a pay period may correspond to a current pay period, an unsettled pay period that has ended without the user receiving their net pay, and a settled pay period that has ended with the user receiving their net pay. For example, a machine learning pay period model may be constructed using a supervised or unsupervised machine learning algorithm. In some embodiments, a machine learning pay period model may be constructed using a logistic regression with regularization. In some embodiments, the calibration data may include historic deposit data (associated with the wage access account) including time of deposit, amount of deposit, advance rate, payroll data, pay period classification, and the like. For example, current deposit data (associated with the wage access account) may be input to the machine learning pay period model and used to generate an output classifying each shift to a corresponding pay period. For example, each pay period type may receive a score (e.g., percentage match score) according to the machine learning pay period model with the highest score above a predetermined threshold (e.g., 80%) used to classify the input data.

Method of Verifying a User

In some embodiments, user verification may be performed to check that that the partner is configured to direct user wages to a financial account of the wage access system to ensure that the wage access system will receive funds from the partner to balance payments made to the user.

As described herein, the wage access system may provide direct deposit data for each user to the partner (e.g., partner device, payroll system) to ensure that funds are directed to an authorized direct deposit account of the wage access system. The wage access system may compare the direct deposit data and user roster data to determine if the wage access accounts listed in the direct deposit data matches the account data (e.g., last 4 digits of bank account) of the user roster data. The wage access system may review user roster data on a predetermined basis (e.g., daily) for changes to financial account data. For example, the wage access system may review the active bank accounts in the user roster data for additions, deletions, and changes that would redirect funds from a partner to a non-wage access account. In some embodiments, the partner may manually confirm the direct deposit data.

In some embodiments, if confirmation of the direct deposit data (by the partner or wage access system) occurs after payroll processing, then the wage access system will assume that the direct deposit will not be received for the current pay period.

Method of Balancing an Account

When data exchange is accurate and timely, the balance in a user wage access account on payday will be zero. However, there may be instances of a balance in the account. In the event of a positive balance in a user wage access account on payday, the wage access account will transfer the positive balance to the user account on payday. In the event of a negative balance in a user wage access account, access to further advances may be temporarily revoked until a resolution is reached. A negative balance may occur due to revision of time worked or new deduction (e.g. garnishment).

In some embodiments, the user may be notified and given a set of options to balance the account. For example, the balance may be carried forward to the next pay period and the wage access system may apply up to the total net earnings of the subsequent pay period to recoup the negative balance. Additionally or alternatively, a user may select to debit the balance immediately from a user financial account. Additionally or alternatively, the user may select a payment plan to spread payment of the balance over time (e.g., up to four pay periods).

Although various embodiments have been described as having particular features and/or combinations of components, other embodiments are possible having a combination of any features and/or components from any of embodiments as discussed above. For example, a provider can engage with employees directly and provide access to earnings based on various risk and workarounds to access net earnings.

As used in this specification, the singular forms "a," "an" and "the" include plural referents unless the context clearly dictates otherwise. Thus, for example, the term "module" is intended to mean a single module or a combination of modules. For instance, an "algorithm" is intended to mean a single algorithm and/or a software program or a combination of algorithms or software programs.

The specific examples and descriptions herein are examples and embodiments may be developed by those skilled in the art based on the material taught herein without departing from the scope of the present invention, which is limited only by the attached claims.

We claim:

1. A method, comprising:

receiving sets of raw data for a current pay period of an entity, each set of raw data being associated with a different time period of a plurality of time periods in the current pay period and including (1) time data indicating time worked by a set of users affiliated with the entity during that time period and (2) earnings data indicating earnings made by the set of users during that time period;

identifying anomalous data in that set of raw data, the anomalous data including at least one of time data errors or earnings data errors;

processing that set of raw data by removing the anomalous data identified in that set of raw data to produce processed data without at least one of the time data errors or the earning data errors;

determining, for the time period associated with that set of raw data, a net earnings amount for each user from the set of users based on the processed data;

updating an available balance of each user from the set of users based at least on the net earnings amount;

receiving, from a user device from the set of user devices, a request to transfer at least a portion of the available balance; and causing, in response to receiving the request to transfer, a transfer of at least the portion of the available balance to a predetermined user account associated with the user.

2. The method of claim 1, further comprising determining, for the time period associated with that set of raw data, a net-to-gross ratio for each user from the set of users based on the processed data.

3. The method of claim 2, further comprising updating an available balance of each user from the set of users based on the net-to-gross ratio.

4. The method of claim 1, wherein identifying the anomalous data in that set of raw data is based on one or more of historical net earnings data, historical gross earnings data, and historical net-to-gross ratio data.

5. The method of claim 2, further comprising, for the time period associated with that set of raw data, a gross earnings amount for each user from the set of users based on the processed data; and adjusting the gross earnings amount based on the net-to-gross ratio and a level of risk associated with for each user from the set of users.

6. The method of claim 1, further comprising sending information indicative of the available balance for each user from the set of users to a set of user devices such that the set of user devices displays the available balance for each user from the set of users.

7. The method of claim 6, wherein sending the information indicative of the available balance for each user from the set of users causes the set of user devices to display the available balance for each user from the set of users and an amount of funds to transfer up to the available balance for each user from the set of users.

8. The method of claim 6, wherein sending the information indicative of the available balance for each user from the set of users causes the set of user devices to display one or more accounts for the transfer.

9. The method of claim 6, wherein sending the information indicative of the available balance for each user from the set of users causes the set of user devices to display one or more of available balance calculations, transfer data, account data, fee data, pay period data, payday data, balance, time worked, estimated transfer completion data, or payment history.

10. The method of claim 1, wherein the predetermined user account includes one or more of a bank account, a payroll card account, a debit card account, a savings account, a charge card account, a pay card account, a payroll card account, and a prepaid card account.

11. The method of claim 1, wherein causing the transfer of at least the portion of the available balance is from a financial account associated with a financial institution to the predetermined user accounts.

12. The method of claim 1, wherein the available balance of each user from the set of users is an available balance of a wage account associated with that user, the method further comprising determining a negative balance being in the wage account of that user.

13. The method of claim 12, wherein the available balance of each user from the set of users is an available balance of a wage account associated with that user, the method further comprising terminating the transfer of future payment amounts to the predetermined user account associated in response to a negative balance being in the wage account of that user.

14. The method of claim 1, wherein the available balance is from an account associated with the entity to the predetermined user accounts.

15. The method of claim 14, wherein the entity includes one or more of an employer, a company, a corporation, an enterprise, an organization, a franchise, or a provider.

16. The method of claim 1, wherein the transfer of at least the portion of the available balance is facilitated by one or more of a debit card network, a payment vendor, or an automated clearing house (ACH).

17. An apparatus, comprising:

a memory; and a processor operatively coupled to the memory, the processor configured to:

receive sets of raw data for a current pay period of an entity, each set of raw data being associated with a different time period of a plurality of time periods in the current pay period and including (1) time data indicating time worked by a set of users affiliated with the entity during that time period and (2) earnings data indicating earnings made by the set of users during that time period;

identify anomalous data in that set of raw data, the anomalous data including at least one of time data errors or earnings data errors;

process that set of raw data by removing the anomalous data identified in that set of raw data to produce processed data without at least one of the time data errors or the earning data errors;

determine, for the time period associated with that set of raw data, a net earnings amount for each user from the set of users based on the processed data;

update an available balance of each user from the set of users based on the net earnings amount;

receive, from a user device from the set of user devices, a request to transfer at least a portion of the available balance; and cause, in response to receiving the request to transfer, a transfer of at least the portion of the available balance to a predetermined user account associated with the user.

18. The apparatus of claim 17, the processor further configured to determine, for the time period associated with that set of raw data, a net-to-gross ratio for each user from the set of users based on the processed data.

19. The apparatus of claim 17, the processor further configured to update an available balance of each user from the set of users based on the net-to-gross ratio.

20. The apparatus of claim 17, the processor further configured to identify the anomalous data in that set of raw data based on one or more of historical net earnings data, historical gross earnings data, and historical net-to-gross ratio data.

* * * * *